Jan. 12, 1965       J. D. LONG ETAL       3,165,739
PULSE TYPE RADAR TIME-MEASURING SYSTEM
Filed Aug. 29, 1960                3 Sheets-Sheet 1

Jan. 12, 1965   J. D. LONG ETAL   3,165,739
PULSE TYPE RADAR TIME-MEASURING SYSTEM
Filed Aug. 29, 1960   3 Sheets-Sheet 2

Jan. 12, 1965  J. D. LONG ETAL  3,165,739
PULSE TYPE RADAR TIME-MEASURING SYSTEM
Filed Aug. 29, 1960  3 Sheets-Sheet 3
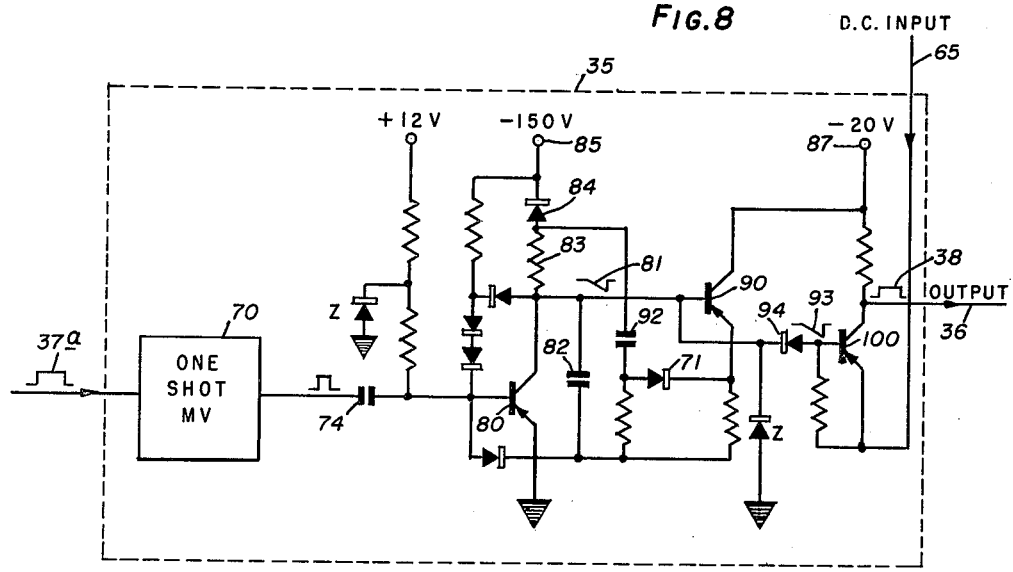
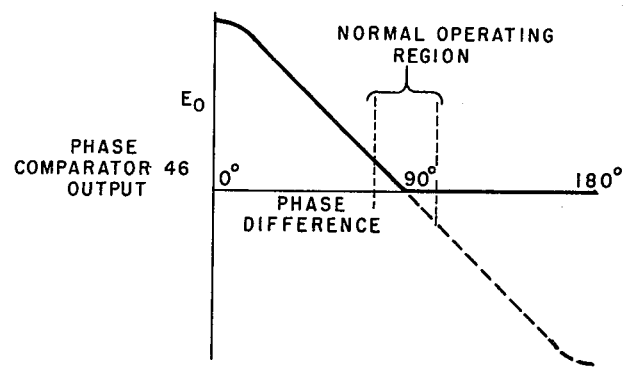
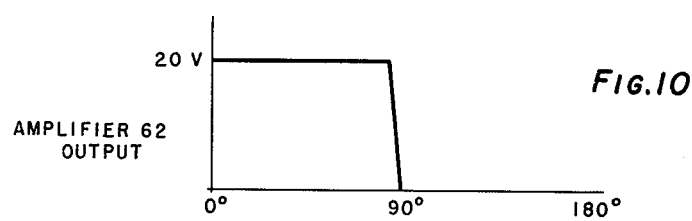

United States Patent Office 3,165,739
Patented Jan. 12, 1965

3,165,739
PULSE TYPE RADAR TIME-MEASURING SYSTEM
James D. Long, North Hollywood, and David W. Young, Jr., Van Nuys, Calif., assignors to The Bendix Corporation, North Hollywood, Calif., a corporation of Delaware
Filed Aug. 29, 1960, Ser. No. 52,680
4 Claims. (Cl. 343—13)

This application is a continuation-in-part of the application of David W. Young, Jr., Serial No. 651,228 filed April 8, 1957 and now abandoned.

This invention relates broadly to the measurement of short intervals of time, and specifically to measurement of the time interval between two pulses of energy, in particular, the time interval between the transmission of a pulse and its return after reflection in a radar ranging system.

An object of the invention is to provide a simple method and apparatus for accurately measuring short time intervals.

Another object is to provide a practicable, accurate method of determining the direction of propagation of received space waves, such as electromagnetic (radio, light, etc.), and sonic waves in fluids, such as air and water.

Other objects and features of the invention will appear from the description to follow.

In accordance with the invention, the wave fronts of two pulses of energy are caused to separately initiate two trains of electrical waves of an arbitary frequency, and the phase relation between the waves in the two trains is measured. The phase relation is readily measured and is easily translated (since the arbitrary frequency is known) into time or a desired function of time.

It is old and well known in the direction-finding art to receive space waves on two transducers to thereby generate two electric waves of the same frequency as the space wave frequency, and measure the phase relation between the electric waves to determine the time interval between arrivals of the space wave at the two transducers. Such a method is limited to space waves of frequencies within the range of electrical waves, whereas the present invention is not. Furthermore, in the prior system, the ratio of the period of the space waves to the time interval to be measured may be such that the phase difference measured may give an inaccurate or ambiguous indication of the time interval, whereas in the present invention the frequency can be chosen to fit the time interval, irrespective of the frequency of the space waves. Again, the energy pulses may be of such short duration that corresponding electrical wave trains of the same frequency and duration would be too short to yield accurate phase readings with practicable phase meters. With the present invention, the electrical waves can be of selected frequency and/or duration to produce accurate phase readings. The two wave trains may be very short, containing only enough cycles to actuate a phase meter, or they may be longer to produce a sustained phase reading in response to reception of a single space signal. Short trains have the advantage that a slight difference in frequency between the two trains can be tolerated, since the error phase shift between two wave trains resulting from frequency difference increases progressively with time.

In the prior art direction-finding systems mentioned, and also in echo distance-measuring systems, the received space wave is seldom pure. It is, more often, a composite wave consisting of a desired component traveling directly from the point the direction or distance of which is to be determined, and extraneous components of the same frequency but different phase traveling indirectly from the desired source to the transducer by reflection from various objects or structures. The resultant electrical wave generated in the transducer is likewise impure, because it is a replica of the composite received waves. The apparent phase of such a composite wave is often an erroneous indication of the time of arrival of the front of the composite wave at the transducer.

A great advantage of the present invention is that the two alternating currents that are phase-compared have pure periodic wave forms the relative phase between which is a clean function of the time interval between the wave fronts that initiate the two alternating currents.

This invention has particular application to altitude measurement owing to the high degree of accuracy of the pulse-echo interval. For example, in an aircraft just before touchdown at an altitude of five feet, the pulse-echo interval for electromagnetic radiation is approximately ten millimicroseconds. With the present level of accuracy of this time measurement system, i.e. ±2 millimicroseconds, altitude readings at or near aircraft touchdown within one foot accuracy have been achieved in actual practice.

As indicated above in accordance with this invention the transmitted pulse and the received pulse are caused to separately initiate trains of electrical waves of an arbitrary frequency and the phase relation between the waves is measured. Preferably the arbitrary frequency is less than that of the transmitted wave but high enough to provide the required accuracy. An example of a suitable arbitrary frequency is one megacycle per second.

In phase comparison systems where the waves being compared may be relatively displaced by one or more complete cycles, an ambiguity may exist because phase comparators are ordinarily to full cycle shifts. The ambiguity may be converted to the parameter measured. In the case of transmitted electromagnetic waves of 1 megacycle having a period of $10^{-6}$ second, the ambiguity occurs at 500 foot intervals. Therefore, the output reading of the phase comparator repeats with each 500 foot change in altitude. Moreover, in phase comparators giving a voltage output proportional to the instantaneous amplitude difference of the compared waves, an ambiguity appears every 180°. Of course, such ambiguities are unacceptable in any operational system. By lowering the arbitrary frequency to 100 kilocycles, the interval between the full cycle ambiguity would be increased to 5,000 feet, but with a reduction in accuracy. Consequently the reduction in arbitrary frequency does not offer a complete solution.

According to the invention the ambiguities inherent in phase detection systems are completely eliminated. This is accomplished by restricting the initiation of one of the trains of waves to a period of time in which the two waves necessarily are displaced less than 180° with respect to each other. It is apparent that the transit time of a pulse from an aircraft to the ground and return at higher altitudes may well exceed the period of one-half cycle so that such a restriction on the measured phase difference would be expected to prevent the operation of this invention above a certain altitude. However a variable delay unit is employed to delay the triggering of the normally leading wave until the phase deviation restriction (less than 180° displacement) is met. At that instant an unambiguous altitude determination may be made. The delay of the variable delay unit is a function of altitude, and the output of a phase comparator constitutes the instantaneous altitude error of the indicator. The error signal derived by the phase comparison is used to correct the indicator.

A full understanding of the invention may be had from the following detailed description with reference to the drawing, in which:

FIG. 8 is a electrical schematic diagram of the electronic delay unit of FIG. 6;

FIG. 9 is a graphical representation of the output characteristics of the phase comparator employed in the system of FIG. 6; and FIG. 10 is a graphical representation of the voltage input to the indicator of the system of FIG. 6 as a function of measured phase deviation by the phase comparator.

Figure 1:
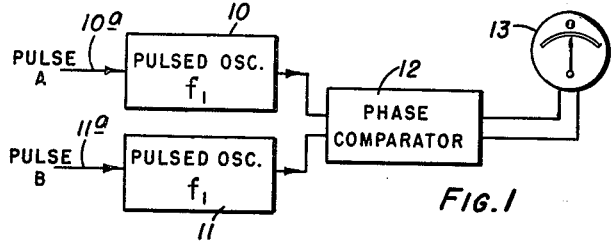
FIG. 1 is a schematic diagram of a system in accordance with the invention for measuring the time difference between two pulses.

The system shown in FIG. 1 comprises a pair of pulsed oscillators 10 and 11 operating at a common frequency $f_1$ which feed into a phase meter 12 which actuates an output meter 13 in proportion to the difference in phase.

Figure 2:
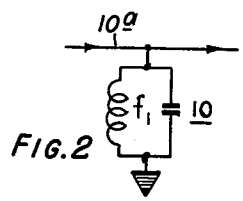
FIG. 2 is a schematic diagram of a ringing circuit that may be employed in the system of FIG. 1.

The oscillators 10 and 11 are normally inactive, but are triggered into oscillation by an input puse applied to input lines 10a and 11a, respectively. In their simplest form, the oscillators 10 and 11 may consist simply of resonant tank circuits, as shown in FIG. 2, consisting of an inductance and a capacitance connected in a closed circuit. It is well known that when any sudden potential is applied to such a circuit, it is shock-excited to develop alternating current at its resonant frequency. The shock-excited oscillations decay at a rate determined by the Q of the circuit so that a decaying wave train is produced in response to each application of a pulse thereto.

The oscillators 10 and 11 can also consist of self-sustaining oscillators which develop continuous waves of constant amplitude so long as an input pulse is supplied thereto. Such a pulsed oscillator circuit that has been used is disclosed in the Radiation Laboratory Series, vol. 19, Section 4.14. For the purpose of the present invention, it is merely necessary that each of the oscillators 10 and 11 begins to oscillate at the common frequency $f_1$ in fixed time relation with respect to the application of a pulse thereto.

The phase comparator 12 may also be of known construction. A conventional circuit that may be used is described in "Electron-Tube Circuits" by Samuel Seely, published by McGraw-Hill Book Company, Inc., in 1950, on pages 483, 484 and 485.

Although, for simplicity, a simple meter 13 has been shown connected to the output of the phase comparator 12, there are many ways of utilizing the output of a phase comparator, and the particular type of indicator or indicating circuit that is employed is immaterial insofar as the basic principles of the present invention are concerned. The output of the phase comparator 12 may be a short D.C. pulse in response to single pulses A and B, or may be a substantially continuous direct current in response to repeated trains of pulses A and B.

Figure 3:
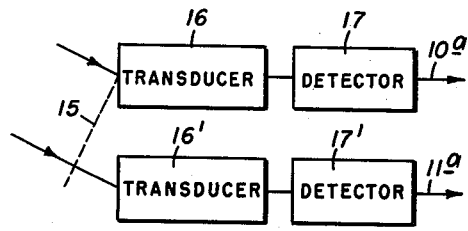
FIG. 3 is a schematic circuit of apparatus that may be used, in conjunction with the apparatus of FIG. 1, for direction-finding.

Referring to FIG. 3, the invention may be used in direction-finding by applying to the input lines 10a and 11a of FIG. 1 pulses produced in response to reception of a space wave. Thus, space wave pulses having wave fronts in the plane 15 may impinge on two transducers 16 and 16', which generate two electrical currents of the same frequency as the space waves. These two currents are independently detected by detectors 17 and 17' and apply to the leads 10a and 11a. The relative times of starting of the wave trains generated in the transducers 16 and 16' depend upon the direction of approach of the space wave relative to the transducers, and the lateral spacing of the transducers.

Figure 4:
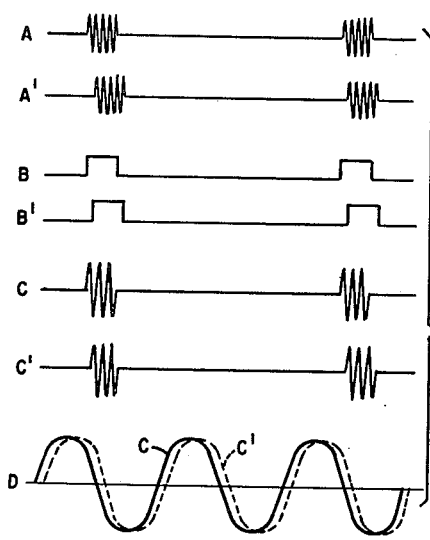
FIG. 4 is a series of graphs illustrating the operation of the systems of FIGS. 1 and 3.

Thus, referring to FIG. 4, curve A shows two successive wave trains initiated in the transducer 16 in response to two received space wave pulses, and curve A' shows two successive trains of waves generated in the transducer 16' by application of the space wave pulses thereto. It will be noted that the space wave front impinges on transducer 16 before it impinges on transducer 16', so that the wave trains A' are retarded with respect to the wave trains A. Curves B and B' show the corresponding video pulses that are produced by detection in the detectors 17 and 17' of the wave trains A and A'. These pulses, B and B', are applied to the oscillators 10 and 11 of FIG. 1 and cause the latter to independently generate two wave trains C and C' of like frequency but displaced in phase in accordance with the spacing between the pulses B and B'. Curve D in FIG. 4 shows small portions of the two waves C and C' superimposed on each other and expanded to illustrate their phase difference. This phase difference is measured in the phase comparator 12 and caused to produce an output indication corresponding thereto on the measuring device 13.

It will be noted that for a given time delay of the wave train $C_1$ with respect to the wave train C, the phase difference measured will be proportional to the frequency of these waves. Hence, a high frequency enables the accurate measurement of shorter time periods. On the other hand, if the frequency chosen is too high with respect to the time interval to be measured, the phase displacement will be greater than 90° and may be ambiguous. A great advantage of the present invention is that the local frequency is selectable because it is independent of the frequency of the received energy. It is usually desirable to choose the local frequency such that the phase displacement between the two waves will be less than 90° in response to the time periods to be measured, but not less than approximately 1°.

It will be understood that the transducers 16 and 16' are of type suitable to the nature of the received energy. As examples: for radio waves, they would be antennas; for sound waves, microphones; for light waves, photoelectric cells. Since the output of a photoelectric cell in response to a light pulse is a direct current pulse, the detectors 17 and 17' would be eliminated. It is also to be understood that the detectors 17 and 17' are not always necessary, since if the waves A, A' in FIG. 4 are of lower frequency than the waves C, C', the oscillators 10 and 11 of FIG. 1 can be pulsed directly by the waves A, A'. Alternatively, if the waves A, A' are higher in frequency than waves C, C', they can be heterodyned to a lower frequency with a local oscillator and applied to the oscillators.

Figure 5:
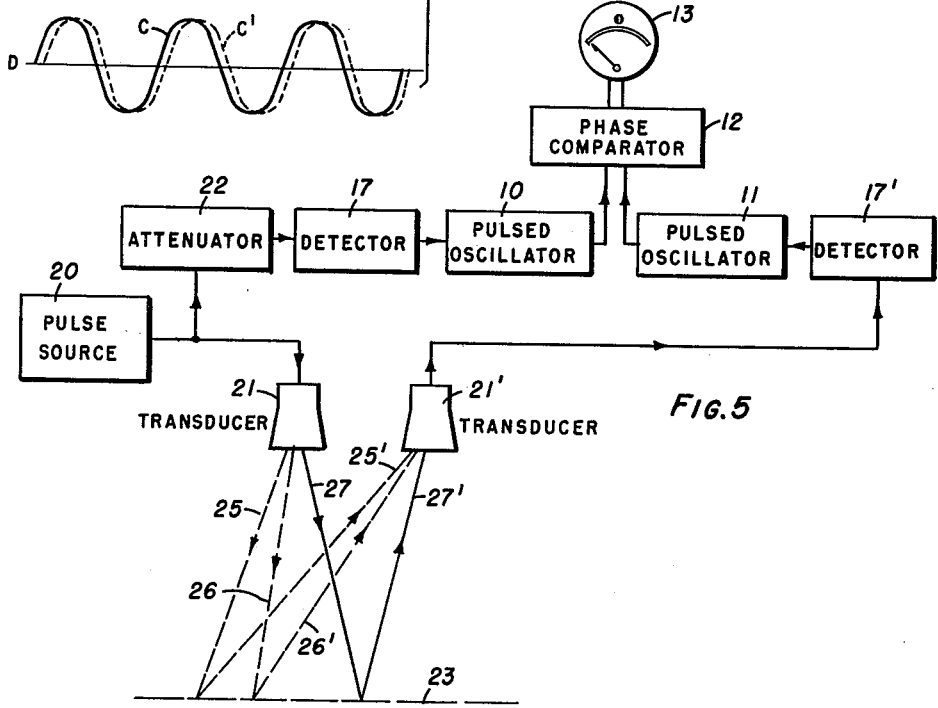
FIG. 5 is a schematic circuit illustrating an application of the invention for distance-finding.

FIG. 5 shows application of the invention to distance-finding, such as the distance from an aircraft to the ground, or the distance to the bottom of a body of water. Electrical waves from a pulse source 20 are applied to a transmitting transducer 21 to generate space waves transmitted downwardly. A portion of the output from the source 20 is directed through an attenuator to a detector 17, and the detected output is applied to pulse the oscillator 10.

The space wave energy from the transducer 21 impinges on the surface 23 (the ground 23, or the bottom of the body of water, as the case may be), and some of it is reflected back to a transducer 21', which converts it to electrical wave energy of the same frequency which is detected in detector 17', and the detected output is applied to pulse the oscillator 11. The phase difference between the outputs of the oscillators 10 and 11 (as shown by the indicator 13) is a function of the time of travel of the space waves from the transducer 21 to the surface 23 and back to the transducer 21'.

In a system of the general type shown in FIG. 5, the transducers are made as highly directive as possible to conserve energy and prevent appreciable direct transfer of space wave energy from transducer 21 to transducer 21'. Nevertheless, the beam from transducer 21 diverges as shown by lines 25, 26, 27, and the lengths of the path from the transducer 21 to the surface 23 and back to the transducer 21', as defined by the lines 25, 25'; 26, 26'; and 27, 27' are different. As a result, the transducer 21' receives a multitude of wave fronts at slightly different times, resulting in an impure wave which, if phase-compared with the output of the pulse source 20 in accordance with prior art practice, would give an inaccurate measure of the distance. In the present system, the pulsed oscillators 10 and 11 yield pure waves, and the phase of the wave from oscillator 11 is determined by the first wave front received by transducer 21' which is received over the shortest path represented by lines 27, 27'.

Figure 6:
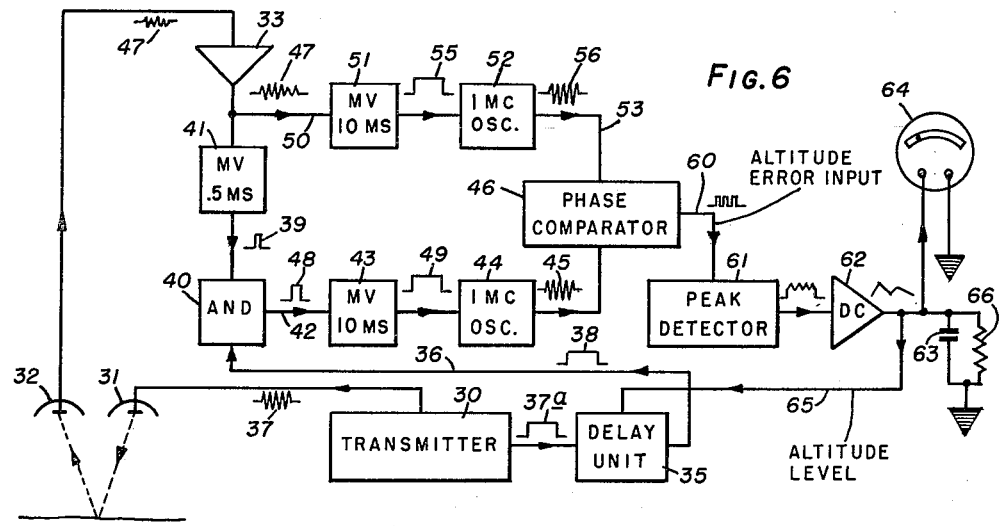
FIG. 6 is a block diagram of a distance-finding application of this invention with an ambiguity free indication.

Referring now to FIG. 6, the altimeter application of the invention shown therein includes a pulsed radio frequency transmitter 30 connected to an antenna 31. A receiver amplifier 33 is connected to a similar antenna 32 in the conventional manner for radar systems. The output of the transmitter 30 is a pulse 37 frequency selected for suitability in radar transmission. An example of a suitable frequency is 4300 megacycles per second. The envelope 37a of the output pulse 37 of the transmitter 30 is simultaneously applied to variable delay unit 35. The output of the delay unit 35 actually is a single pulse 38 having its leading edge delayed with respect to the leading edge of the transmitted pulse 37a. The pulse 38 in introduced through lead 36 to a coincidence or AND gate 40. The second input to the coincidence gate 40 is a shorter pulse 39 from a one-shot multivibrator 41 which is triggered by the output of the receiver-amplifier 33 upon the reception of a return echo 47. The AND gate 40 under conditions of simultaneous inputs produces an output pulse 48 on lead 42 constituting the triggering input to a one-shot multivibrator 43 which produces a pulse 49 to cause an oscillator 44 to oscillate for the period of the pulse 49. The oscillator 44 therefore produces a first train of waves of arbitrary or selected frequency e.g. one megacycle and of arbitrary length determined by the length of the pulse 49 from multivibrator 43. The output train of waves 45 from oscillator 44 is introduced into a phase comparator 46. This phase comparator has the output characteristic shown in FIG. 9 and described below in connection with that figure.

The receiver-amplifier 33 in addition to supplying a triggering pulse to the multivibrator 41 supplies the same pulse, over a lead 50, to a multivibrator 51 comparable to the multivibrator 43. Multivibrator 51 provides a control pulse 55 to an oscillator 52 having the same arbitrary frequency of oscillation as the oscillator 44. The oscillator 52 produces a second train of waves 56 of length equal to the pulse 55 from the multivibrator 51. The train of waves 56 is introduced over lead 53 to the phase comparator 46 in which any deviation from a predetermined phase relation between the trains of waves 45 and 56 is detected and appears on the output lead 60 as a pulse voltage varying in amplitude directly with the amount of variation from the predetermined phase relation, in this instance, 90° phase difference. This pulse voltage is applied to a peak detector 61 the output of which is amplified by a high gain D.C. amplifier 62 to produce a D.C. output having a magnitude varying with phase deviation between the trains of waves 45 and 56 as shown in FIG. 10. The D.C. output of amplifier 62 is applied to a capacitor 63 which is connected across a voltmeter 64 calibrated in terms of altitude. The capacitor 63 charges toward the output voltage level of amplifier 62 during periods of phase deviation. The charge on capacitor 63 slowly leaks off through a resistor 66 during periods of non-operation of both oscillators 44 and 52.

The system described as above corresponds substantially to the phase comparison system of FIG. 5 with the addition of the delay unit 35, the AND gate 40 and the multivibrator 41. These elements are responsible for the elimination of any ambiguities in the system which might otherwise occur where the received echo is delayed to such an extent that the phase deviation of ± 90° from the normal 90° difference of the waves 45 and 56 is encountered. This elimination of ambiguity is achieved by (1) introducing the direct current output of amplifier 62 into the delay unit 35 over lead 65 to vary the delay of unit 35 as a direct function of the voltage on capacitor 63 to attempt to "match up" the delay of the pulse-echo transit time and (2) by triggering both oscillators only if the match in delay is sufficient that the error in delay is less than one-half the period of the oscillators' frequency, i.e. the limit of the nonambiguous phase comparison.

The delay unit 35 includes a one-shot multivibrator 70 triggered by a positive pulse 37a which is the crystal detected envelope of the radio frequency pulse from the transmitter 30. The multivibrator 70 is coupled through a capacitor 74 to the base electrode of a transistor 80 operated as a normally closed switch opened in response to pulses from multivibrator 70 to apply a supply voltage 85 across a series circuit made up of a capacitor 82, a resistor 83 and a diode 84 to produce a negative ramp voltage 81 as the capacitor 82 charges toward the supply voltage 85.

A transistor 90 is connected as an emitter follower with the voltage across the capacitor 82 applied to the base-emitter circuit and the collector electrode connected to a negative voltage source 87. The transistor 90 has a feedback path through a diode 71 and a capacitor 92 to back bias diode 84 and thereby interrupt the charging current path to the capacitor 82 from supply 85 and to substitute therefor as a constant current source. The constant current from transistor 90 produces a linear ramp voltage 93 conducted through a blocking diode 94 to the base electrode of a transistor 100 serving as a voltage comparator between the ramp voltage 93 and direct current input from the D.C. amplifier 62 of FIG. 6 over lead 65 applied to the emitter electrode of transistor 100.

The ramp voltage 93 varies from an initial voltage level of −1.5 volts in a negative direction at a rate of 1 volt per microsecond beginning in point of time related to the first cycle of each radio frequency train of oscillations or pulse from the transmitter 30. During the initial period of the ramp voltage 93 excursion the voltage on the base electrode of transistor 100 exceeds that of the emitter supply by the error voltage over lead 65, the emitter-base junction is back biased and the transistor 100 cut off. When the ramp voltage 93 reaches a less positive value than the emitter voltage, transistor 100 conducts and an output pulse 38 appears on lead 36 lasting for the remainder of the ramp voltage 93 duration. The output pulse 38 is delayed from the time of the initial cycle of the transmitter pulse for a period directly proportional to the direct current input on lead 65.

ALTIMETER CIRCUIT OPERATION

Figure 7:
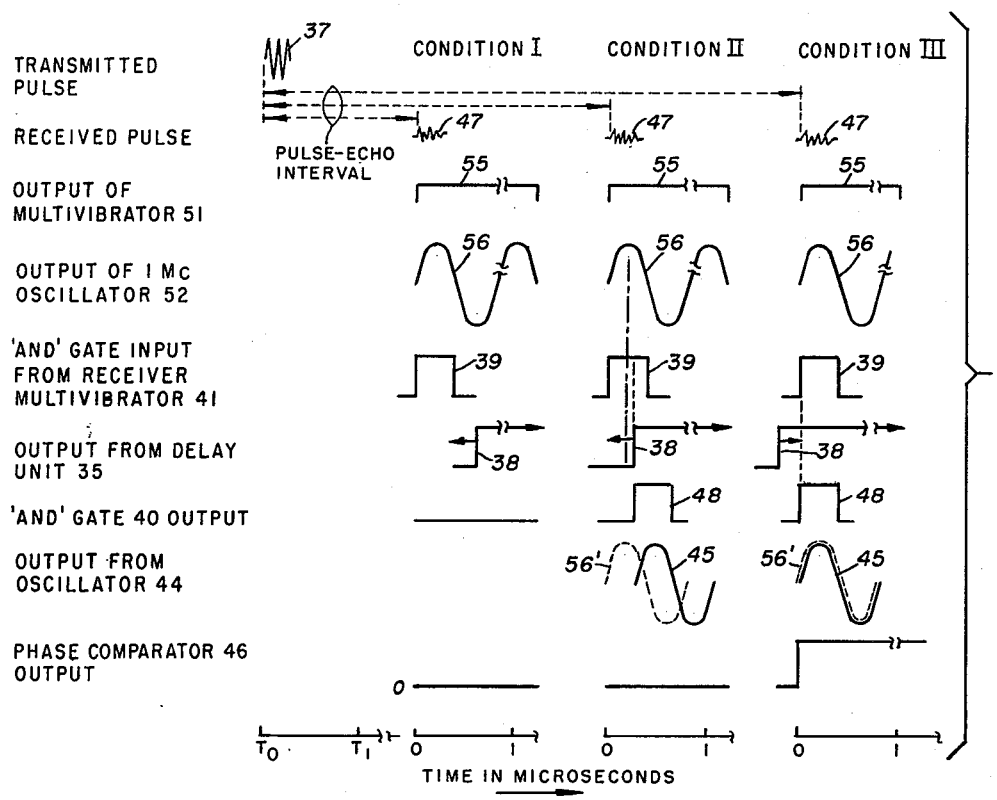
FIG. 7 is a graphical showing of the operation of the system of FIG. 6.

The operation of this version of the invention may be understood by reference to FIG. 6 in conjunction with FIG. 7. There are three modes of operation identified in FIG. 7 as Conditions I, II, and III, depending upon the time of arrival of the return echo relative to the delay furnished by unit 35. They are:

*Condition I.*—When the return echo 47 arrives at the altimeter after a pulse-echo interval which is less than the delay of unit 35 indicating that the actual altitude is less than shown on the indicator 64;

*Condition II.*—When the return echo 47 arrives at the altimeter after a pulse-echo interval approximating (within one-half cycle of the oscillators 44 and 52) the delay of unit 35 indicating that the indicator 64 shows an altitude reading which is substantially correct;

*Condition III.*—When the return echo 47 arrives at the altimeter after a pulse-echo interval greater than the delay of unit 35 indicating that the indicator 64 shows an altitude less than actually exists.

Condition I

Considering first Condition I, the return echo 47 causes the triggering of the multivibrator pulse 55 which in turn triggers the oscillators 52 to produce the sinusoidal output wave 56. The return pulse 47 also triggers the multivibrator 41 producing the pulse 39 which has already been noted as having a duration equal to one-half cycle of the oscillation 56. The pulse 38 from delay unit 35 occurs following the pulse 39 so that there is no coincidence between the pulses 38 and 39 and the AND gate 40 remains nonconductive. Therefore the oscillator 44 is not triggered and no wave 45 is produced to be compared with the wave 56. The phase comparator output therefore is zero and no voltage is applied to the storage capacitor 63 and the meter 64. It should be noted that the leading edge of the pulse 38, marked with an arrow, constantly moves in the direction of the arrow owing to the discharge of any voltage on the capacitor 63 through its associated resistor 66. The rate of movement of the leading edge of pulse 38 is a function of the time constant of the capacitor 63 and resistor 66. It is the instantaneous voltage on the capacitor 63 which determines the delay between the leading edge of pulse 38 and the initial excursion of the transmitted pulse 37.

There is no coincidence between the pulses 38 and 39 in Condition I; however, the pulse 38 constantly is moving in the direction of the arrow so that on subsequent pulse-echo cycles coincidence will later occur, as in Conditions II and III.

Condition II

Considering now Condition II, the return echo 47 as in the case of Condition I, triggers pulse 55 which in turn triggers the wave 56 from the oscillator 52. The pulse 39 again has its leading edge coinciding with the initial excursion of wave 56. The leading edge of pulse 38 has moved with the discharge of voltage in capacitor 63 to a point where there now is coincidence between the pulse 38 and the pulse 39. With the coincidence the AND gate 40 produces an output pulse 48 which triggers the multivibrator 44 to produce the wave train 45.

The phase comparator is operative then to compare the deviation between the wave 45 and the wave 56 shown overlapping the wave 45 as a dashed wave 56'. The pulse 38 occurred in the latter half of the pulse 39 indicating that the wave 45 lags the wave 56 time by slightly more than the normal 90°, as would be the case if the leading edge of pulse 38 coincided with the dot-dash line. Since the pulse 38 was delayed slightly longer than the optimum amount no correcting voltage pulse applied to the capacitor 63 is necessary. The present voltage is slightly high and the continued discharge of that voltage through the resistor 66 will drive the pulse 38 towards the left.

Therefore under conditions of coincidence between the two pulses where the measured phase difference is between 90 and 180° the output of the phase comparator need be zero. Such is the case as is shown in FIG. 7. The voltage on the capacitor 63 is substantially correct and within a few microseconds it will be actually correct and the needle of the meter 64 will have fallen off to the correct altitude reading.

Condition III

Considering now Condition III which exists when the return echo pulse arrives at the altimeter later than the delay of unit 35, the return echo pulse 47, as in the cases of Condition I and Condition II, triggers the multivibrator 51 producing the pulse 55 which in turn triggers the oscillator 52 to produce the sine wave 56, and also produces the pulse 39 coinciding with the first half cycle of the wave 56. As indicated above the delay in unit 35 is less than the actual pulse echo interval so that pulse 38 has started prior to the generation of pulse 39. The AND gate 40 will recognize coincident inputs of pulses 38 and 39 and is rendered conductive on the leading edge of pulse 39 which is the latter of the two pulses to arrive at the AND gate 40. The pulse 48 triggers the second train of waves 45. Since pulses 39 and 48 have coincident leading edges and the leading edge of pulse 39 coincides with wave 56 and the leading edge of pulse 48 coincides with the second train of waves 45 the two trains of waves 45 and 46 are in phase. This may be seen from the relative position of wave 45 and wave 56' which is wave 56 projected to overlie wave 45 for ease of comparison.

The phase comparator 46 is designed to produce maximum output when the phase difference between the two trains of waves is less than 90° as shown by the large voltage excursion of the output of the phase comparator (FIGS. 9 and 10). This phase comparator output is the error signal which is applied through the amplifier 62 to increase the voltage on the capacitor 63. Increases in voltage on capacitor 63 are reflected as additional delay in the position of the leading edge of pulse 38 so that with the error output from the phase comparator 46 the leading edge of the pulse 38 is driven towards the right in the drawing until it is positioned (upon succeeding cycles) in the interval of pulse 39 and ideally at the center point of 39.

The characteristic of the phase comparator 46 giving rise to the correcting voltage for the capacitor 63 and for the delay unit 35 is illustrated in FIG. 9. The phase comparator 46 has a relatively linear output characteristic between zero degrees and 90° phase difference, with the output zero volts at 90° phase difference between the compared waves. Although the linear region of the phase comparator output extends from 90° to substantially 180° as indicated by the dashed line, the negative polarity output region is not used and the phase comparator 46 produces zero output volts whenever the phase difference is between 90° and 180°. Any phase differences greater than 180° are not encountered since the pulse 39 only lasts for one-half cycle of the first excursion of the wave 56, and the second wave 45 can only be triggered during the interval of the pulse 39.

The normal operating region for the phase comparator is indicated in the drawing, FIG. 9. The range is rather limited, being only a few degrees of phase deviation from the normal 90° phase difference.

The correcting voltage which is actually applied to the capacitor 63 as a function of the phase difference between the two waves is shown in FIG. 10. At 90° phase difference, the normal operating point, no voltage is applied to the capacitor and it will discharge what voltage it has through associated resistor 66 tending to reduce the delay of the unit 35 and tending to cause the train 45 to start at an earlier time position with respect to the wave 56. Whenever the phase difference is less than approximately 85° between the two trains of waves, the output of the amplifier 62 is a maximum, e.g. 20 volts, tending to charge the capacitor rapidly toward that value. With succeeding cycles during which the phase difference between the waves approaches the 90° value the correcting voltage applied to the capacitor 63 is reduced until it is zero at the normal operating phase difference of 90° or any phase difference greater than 90°.

ALTIMETER OPERATING CYCLE

Considering now a normal cycle of operation with an altimeter of this invention installed on an aircraft, and the aircraft resting on the ground, in a normal installation the distance from the antenna to the ground, under these conditions is of the order of five feet and the distance traveled by the transmitted pulse is 10 feet. The pulse-echo interval for electromagnetic radiation is approximately two millimicroseconds per foot of travel so the pulse-echo interval with the aircraft on the ground is 10 millimicroseconds.

Under these circumstances with no voltage across capacitor 63 and the indicator reading zero, a normal residual delay of ten millimicroseconds in unit 35 allows the pulse 38 to fall within the period of pulse 39 establishing Condition II. Upon take off and increase in the pulse-echo interval as the aircraft leaves the ground the pulse 39 is delayed in time and Condition II of FIG. 7 prevails. As the wave 56 is delayed, an error signal from phase comparator 46 is applied to capacitor 63 giving a positive altitude reading on indicator 64 and moving the leading edge of the pulse 38 toward the right in FIG. 7, Condition II. As soon as the pulse 38 has moved back until it coincides with the center line of pulse 39 there will be no more correcting voltages applied to the capacitor until the next delay of wave 56 is detected. The maximum rate of response of the altimeter upon this condition of increasing altitude is in the order of 50,000 feet per second so that the altimeter responds effectively instantaneously to aircraft movements from the ground. Decreases in altitude are registered at a rate of 10,000 feet per second which is a function of the time constant of the capacitor 63 and its associated resistor 66, which may be in the order of one-half second.

In normal operation two types of discontinuities can be encountered where the aircraft is operating over a terrain of marked irregularity. Where the aircraft flying at one altitude suddenly encounters a lesser altitude the pulse 39 arrives well in advance of the normal expected delay as indicated by the leading edge of pulse 38, as shown in Condition I of FIG. 7. Under these conditions the phase comparator produces no output and the voltage on the capacitor continues its discharge through a resistor 66 until pulse 38 has moved to the left and overlaps pulse 39, as in the case of Condition II.

Where the aircraft in operation suddenly encounters a much greater altitude the pulse 39 arrives at a later period than expected as in Condition III and coincidence between pulses 38 and 39 occurs, such as to cause the trains of waves 45 and 56 to be substantially in phase and the phase comparator 46 to produce a large error signal which is used to rapidly move the indicator needle to the proper reading.

These situations of encountering discontinuities in altitude sufficient to depart from the normal operating conditions occur only if the altitude discontinuity amounts to at least 125 feet occuring in one pulse-echo cycle. Since the normal pulse rate is 3000 cycles per second this requires that the discontinuity in the order of 125 feet or more must occur in less than 1/3000th of a second, a truly abnormal condition at ordinary aircraft speeds.

Therefore, it has been shown that in accordance with this invention radar type direction finding or ranging units of high accuracy may be achieved. This is accomplished by employing a pair of oscillators, one triggered by the transmitted pulse and the other by the received echo, in the case of ranging units, or in the case of direction finding equipment, one triggered by one portion of the wave front striking one transducer and the other by the same wave front activating a second transducer spaced from the first. The oscillators have arbitrary frequencies high enough to offer high resolution in a subsequent phase comparison and they have a frequency which is completely independent of the nature or frequency of the waves producing their triggering input. Moreover the possible ambiguity which inherently exists in phase comparison systems whenever the phase difference between the two compared waves exceeds 180° is eliminated. This is achieved by triggering one oscillator only during the short period to-wit, one-half cycle of one of the waves during which there can be no ambiguity. The variable delay circuit automatically scans the range of possible trigger intervals until the ambiguity free period is reached at which time the second oscillator is triggered and the phase comparison completed.

Insofar as accuracy is concerned, apparatus in accordance with this invention responds to time differences between the triggering inputs in the order of two millimicroseconds. This allows accuracy in operational altimeters in the order of ± one-half foot at five feet altitude where heretofore altimeters have seldom provided accurate readings at levels below 200 feet.

Throughout this description, the two oscillators are described as having a common arbitrary frequency, such as one megacycle per second. It is, however, within the contemplation of this invention that different frequencies or frequencies harmonically related might be used provided a usable output of a phase comparator may be derived therefrom. Identity of the frequency of the two oscillators is, however, preferred.

Although for the purpose of explaining the invention a particular embodiment thereof has been shown and described, obvious modifications will occur to a person skilled in the art, and we do not desire to be limited to the exact details shown and described.

We claim:

1. A system for measuring the time interval between two time-related signals comprising:
   a first continuous wave oscillator;
   means for triggering said first oscillator responsive to a first signal;
   a second continuous wave oscillator of the same frequency as said first oscillator;
   means responsive to a first signal for enabling said second oscillator for a period equal to one-half cycle of the operation of said first oscillator;
   said second oscillator enabling means including variable delay means for controlling the time of enablement of said second oscillator, said variable delay means having a continuously varying delay in the absence of a second signal;
   means for triggering said second oscillator responsive to a second signal during the enabled period;
   means for comparing the phase of the outputs of said first and second oscillators; and
   means for indicating the time difference between said signals as a function of the measured phase difference of said oscillators.

2. A pulse-echo distance-measuring system comprising:
   a pulse transmitter;
   a pulse receiver;
   a first continuous wave oscillator;
   means responsive to detection of a signal by said pulse receiver for triggering said first oscillator;
   a second continuous wave oscillator;
   means responsive to the transmission of a pulse by said pulse transmitter for triggering said second oscillator;
   said last means including controllably variable delay means;
   means for comparing the phase of continuous waves generated by said first and second oscillators;
   means for utilizing the output of said phase comparator as representing the pulse echo interval;
   means for applying the output of said phase comparator to said delay means to control the time interval between the transmission of a pulse and the triggering of said second oscillator;

and means in addition to said phase comparator for continuously varying said delay means.

3. A pulse-echo distance-measuring system comprising:
a pulse transmitter;
a pulse receiver;
a first continuous wave oscillator;
means responsive to the detection of a signal by said pulse receiver for triggering said first oscillator;
a second continuous wave oscillator;
means responsive to the transmission of a pulse by said pulse transmitter for triggering said second oscillator;
said last means including variable delay means;
a phase comparator for said first and second oscillators producing an output voltage varying in magnitude proportional to the phase deviation of said oscillators from a selected normal phase relationship;
the output of said phase comparator representing the pulse echo interval;
means for applying the output voltage of said phase comparator to said delay means to control the time interval between transmission of a pulse and triggering of said second oscillator;
and means for continuously discharging the voltage output of said phase comparator at a controlled rate.

4. The combination in accordance with claim 3 including gating means responding to the detection of a signal by said receiver for enabling said second oscillator only during the period of a selected one-half cycle of the operation of said first oscillator whereby a phase comparison between said first and second oscillator only occurs when said second oscillator is operative during a selected period of the first oscillator.

References Cited in the file of this patent

UNITED STATES PATENTS

| | | |
|---|---|---|
| 2,403,527 | Hershberger | July 9, 1946 |
| 2,537,574 | Crosby | Jan. 9, 1951 |
| 2,574,494 | Palmer | Nov. 13, 1951 |
| 2,776,427 | Bedford | Jan. 1, 1957 |
| 2,877,414 | Pope | Mar. 10, 1959 |
| 2,970,262 | Haase | Jan. 31, 1961 |